(No Model.)

2 Sheets—Sheet 1.

C. A. BARTLIFF.
BEER COOLER.

No. 294,183.

Patented Feb. 26, 1884.

WITNESSES:
W. W. Hollingsworth
A. G. Leyne

INVENTOR:
C. A. Bartliff
BY Munn & Co.
ATTORNEYS.

(No Model.) 2 Sheets—Sheet 2.

C. A. BARTLIFF.
BEER COOLER.

No. 294,183. Patented Feb. 26, 1884.

WITNESSES:
W. W. Hollingsworth
A. G. Loyne

INVENTOR:
C. A. Bartliff
BY Munn & Co
ATTORNEYS.

UNITED STATES PATENT OFFICE.

CHARLES A. BARTLIFF, OF BARTLETT, TENNESSEE.

BEER-COOLER.

SPECIFICATION forming part of Letters Patent No. 294,183, dated February 26, 1884.

Application filed July 2, 1883. (No model.)

*To all whom it may concern:*

Be it known that I, CHARLES A. BARTLIFF, of Bartlett, in the county of Shelby and State of Tennessee, have invented a new and useful Improvement in Beer Coolers and Mixers, of which the following is a full, clear, and exact description, reference being had to the annexed drawings, forming part of this specification.

The object of my invention is to provide a transformable beer and water cooler and mixer of stale and fresh beer, whereby stale or flat beer may be revived, so as to change it from a dead loss to profit to the dealer. In reviving stale beer by mixing it with fresh beer it is necessary that the proportion of each shall be properly regulated, and that they shall be agitated and afterward allowed to stand for a short time, in order to give the carbonic-acid gas time to act on and revive the stale or flat beer.

In carrying out my invention I provide a combined ice-basket and beer-pipe (which is to be of sufficient length to allow the stale and fresh beer to be together in their passage through the same) long enough to give the gas time to act on and revive the stale beer, even when there is a constant stream of beer flowing through the cooler and mixer. The inlet-pipes for the stale and fresh beer are made of such a size that twice as much fresh as stale beer shall be admitted.

Figure 1:
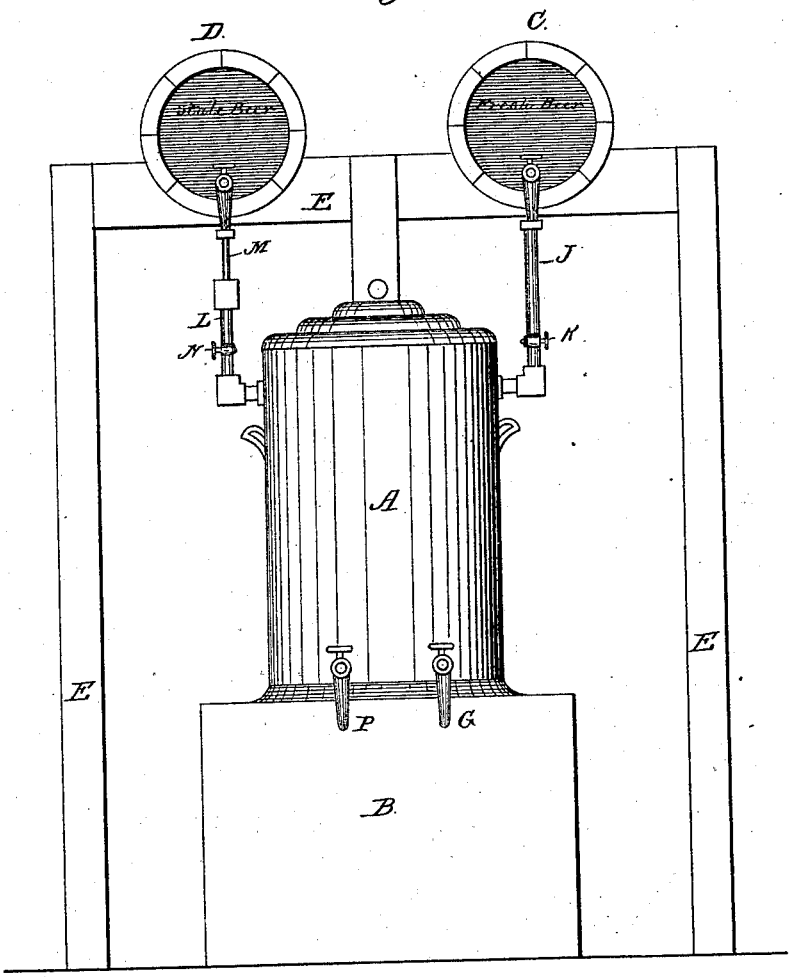
Figure 2:
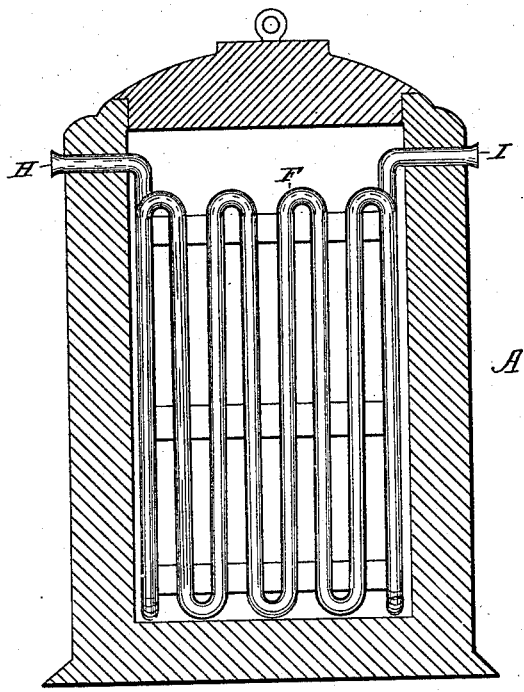
Figure 3:
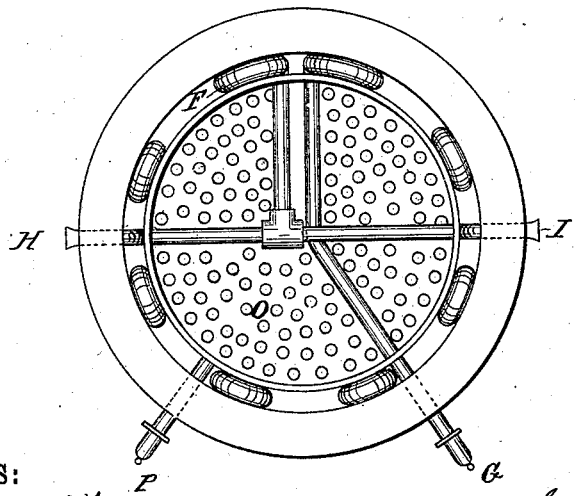

In the drawings, Figure 1 is an elevation of the mixing and cooling apparatus. Fig. 2 is a sectional view of the cooler and mixer, and Fig. 3 is a plan view of the same with the top removed.

A indicates an ordinary water-cooler supported on a stand, B, and C and D are respectively kegs of fresh and stale beer supported above the cooler A on a stand, E. Inside the coller is a combined ice-basket and receptacle for beer, consisting of a continuous pipe, F, which begins at the center of the bottom of the cooler and extends to the wall, thence up and down around the inner surface of the cooler in such manner as to form a cylindrical body having a central cavity for holding ice. The pipe finally extends to the bottom of the cooler and across the same, passing out through the wall and terminating in the cock G. The inner end of the pipe at the center of the bottom of the cooler is connected to two branch pipes, H and I, which extend across to opposite sides and up near the top of the cooler, and thence through the wall. To one of these pipes the keg of fresh beer is connected by means of the pipe J, which is provided with a cock, K, and the keg of stale beer is connected to the other by means of the pipe L. The pipe L is formed with a section, M, which is intended to be about one-half the size of pipe J, in order that when both pipes are discharging into the pipe F there shall be twice the quantity of fresh beer introduced that there is of stale beer. The pipe L is also provided with a cock, N, and is to be provided with a suitable valve, to prevent the beer from being driven back into the stale-beer keg by the action of the carbonic-acid gas from the fresh beer.

The action will be as follows: When the cocks K and N are open, beer will be discharged into pipe F both from the keg of stale beer and from the keg of fresh beer, and the effect of the carbonic-acid gas in the fresh beer will tend to drive the fresh beer through the pipe F, causing it to mingle with the stale beer until the latter becomes again impregnated with the gas. At the same time the beer in pipe F will be cooled by the ice in the cooler, and it may be drawn off at cock G.

O is a perforated shelf for supporting the ice and protecting the pipes. The cooler is provided with a cock, P, for drawing off ice-water. When desired, the pipe F and its connections may be readily removed from the cooler, and the latter may be used simply for ice-water.

What I claim is—

The combination, with the cooler, of the ice-basket formed of pipe F, having two inlets for stale and fresh beer, respectively, and an outlet for drawing off the beer after it is mixed and cooled, substantially as shown and described.

CHAS. A. BARTLIFF.

Witnesses:
W. O. EDWARDS,
W. R. CROSS.